R. P. JACQUES.
CONNECTOR FOR LUBRICATING APPARATUS.
APPLICATION FILED AUG. 23, 1920.
1,383,306.
Patented July 5, 1921.
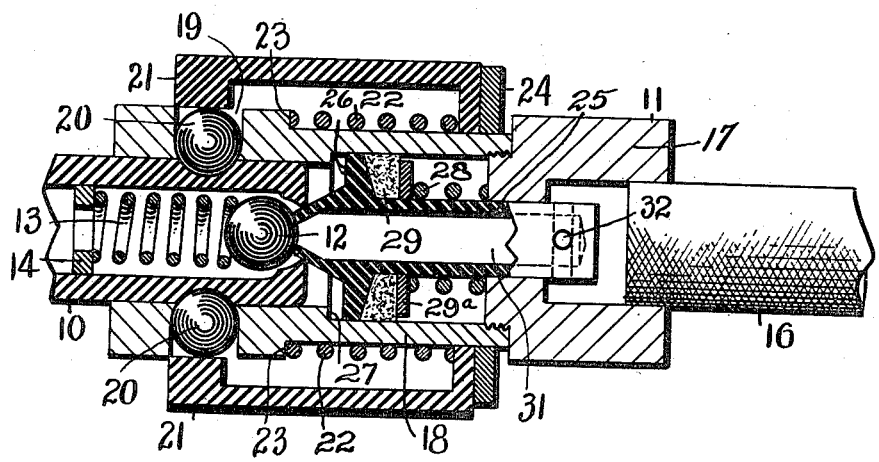
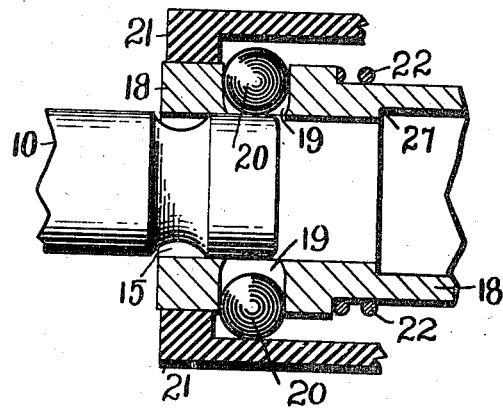

UNITED STATES PATENT OFFICE.

RAYNALDO P. JACQUES, OF WOONSOCKET, RHODE ISLAND.

CONNECTOR FOR LUBRICATING APPARATUS.

1,383,306.  Specification of Letters Patent.  Patented July 5, 1921.

Application filed August 23, 1920. Serial No. 405,349.

*To all whom it may concern:*

Be it known that I, RAYNALDO P. JACQUES, a citizen of the United States, residing at Woonsocket, in the county of Providence and State of Rhode Island, have invented a new and useful Connector for Lubricating Apparatus, of which the following is a specification.

This invention relates to a connector capable of general application but particularly designed for connecting a grease gun to a grease cup.

It is a great advantage to be able to fill a grease cup without the necessity of removing the cap thereof. Such removal is laborious, unpleasant, and wasteful of both time and grease. It is therefore desirable to provide a valve or other device in each cap for normally closing the grease cup, together with some simple means for connecting the gun to the cup, so that the grease may be forced into the cup through the valve without removing the cap. A firm connection is required, as heavy grease is commonly used, which can only be forced through a restricted passage by the use of considerable pressure.

It is the object of my invention to provide a connector for this and other purposes which will be simple and economical to manufacture, convenient in operation, and strong and reliable in use.

With this general object in view, my invention further relates to certain arrangements and combinations of parts which will be hereinafter described and more particularly pointed out in the appended claims.

A preferred form of my invention is shown in the drawings, in which—

Figure 1 is a sectional longitudinal elevation of the connector with the parts assembled, and Fig. 2 is an enlarged detail view showing the parts partially separated.

Referring to the drawings, the improved connector comprises a nipple or cap 10 designed to be mounted on a grease cup or to form a portion thereof, and a nozzle 11 adapted to be detachably secured thereto. The nipple 10 is preferably provided with a valve 12, shown herein as a ball valve and forced yieldingly outward against the reduced end of the nipple opening by a spring 13. The inner end of the spring engages a ring 14, fixed within the nipple. The nipple 10 is also provided with a circumferential groove 15, as clearly shown in Fig. 2.

The second member or nozzle 11 is commonly connected by a flexible tube 16 to a grease gun or other lubricant container, (not shown). The nozzle 11 comprises a head 17 which may be soldered or otherwise secured to the tube 16 and a sleeve 18 threaded to the head 17, and forming an extension thereof. The sleeve 18 is provided with two or more radial recesses 19, adapted to receive locking balls 20. A second sleeve 21 is slidable outside of the sleeve 18 and is yieldingly held in the position shown in Fig. 1 by a spring 22 bearing against a shoulder 23 on the member 18 and forcing the end of the sleeve 21 against a collar 24 fixed on the member 18. When in this position, the sleeve 21 locks the balls 20 as shown in Fig. 1 and prevents separation of the nipple 10 and the nozzle 11.

When the parts are to be either separated or connected, the sleeve 21 is moved manually against the pressure of the spring 22 to the position shown in Fig. 2, permitting the balls 20 to move radially outward, releasing the nipple.

A plunger 25 is slidable axially in bearings in the nozzle members 17 and 18. A flange 26 on the plunger is normally seated against a shoulder 27 within the member 18 and is yieldingly held in this position by a spring 28 positioned between the flange 26 and the head 17. A leather washer 29 and a metal washer 29ª are preferably interposed between the flange 26 and the spring 28. The washer 28 may have the cross section shown in Fig. 1 and the adjacent face of the flange 26 may be conical, as also indicated in Fig. 1, this shape tending to force the washer 28 outwardly against the sleeve 18 to form a tight packing for the plunger which fits somewhat loosely in its bearings.

The conical outer end of the plunger 25 is adapted to force the ball valve 12 from its seat and also to fit closely in the opening in the end of the nipple 10. An axial passage 31 in the plunger 25 connects at one end with transverse openings 32 in the plunger, thus providing a path for the grease when the device is in use. When the parts are separated, however, the spring 28 forces the plunger against the shoulder 27 and moves the openings 32 into the bearing portion of the head 17, thus closing the openings and preventing escape of grease when the nozzle is disconnected from the grease cup.

From this description, it will appear that

I have provided a simple means of connecting a grease gun or other lubricator to a grease cup or similar device in such a way that the parts are firmly connected and will retain their position against relatively heavy pressure exerted through the tube 16. The washer 29 prevents escape of grease from the nozzle except through the axial passage 31. Furthermore, the passage 31 is closed at its inner end as soon as the nozzle is disconnected from the nipple.

Having thus described my invention it will be evident that changes and modifications may be made therein by those skilled in the art, within the spirit and scope of my invention as set forth in the claims and I do not wish to be otherwise limited to the details herein disclosed but what I claim is:—

1. A connector for lubricating apparatus having, in combination, a nipple with a recessed outer surface, a nozzle having radially movable locking elements co-acting with said recessed nipple, an outer locking sleeve covering said elements in all positions, said sleeve being slidable on said nozzle and having a recess receiving portions of said locking elements when said sleeve is removed from locking position, and a spring effective to hold said sleeve yieldingly in locking position.

2. A connector for lubricating apparatus having, in combination, a nipple having a recessed outer surface, a nozzle having radially movable locking elements co-acting with said recessed nipple and manual releasing means normally holding said elements in locking position, said nozzle having a spring pressed plunger with an axially extending passage therethrough for the lubricant and having a conical outer end yieldingly engaging the edge of the axial opening in the nipple and forming a tight connection therewith.

In testimony whereof, I have hereunto affixed my signature.

RAYNALDO P. JACQUES.

Witness:
 H. P. SUTTON.